Figure 1:
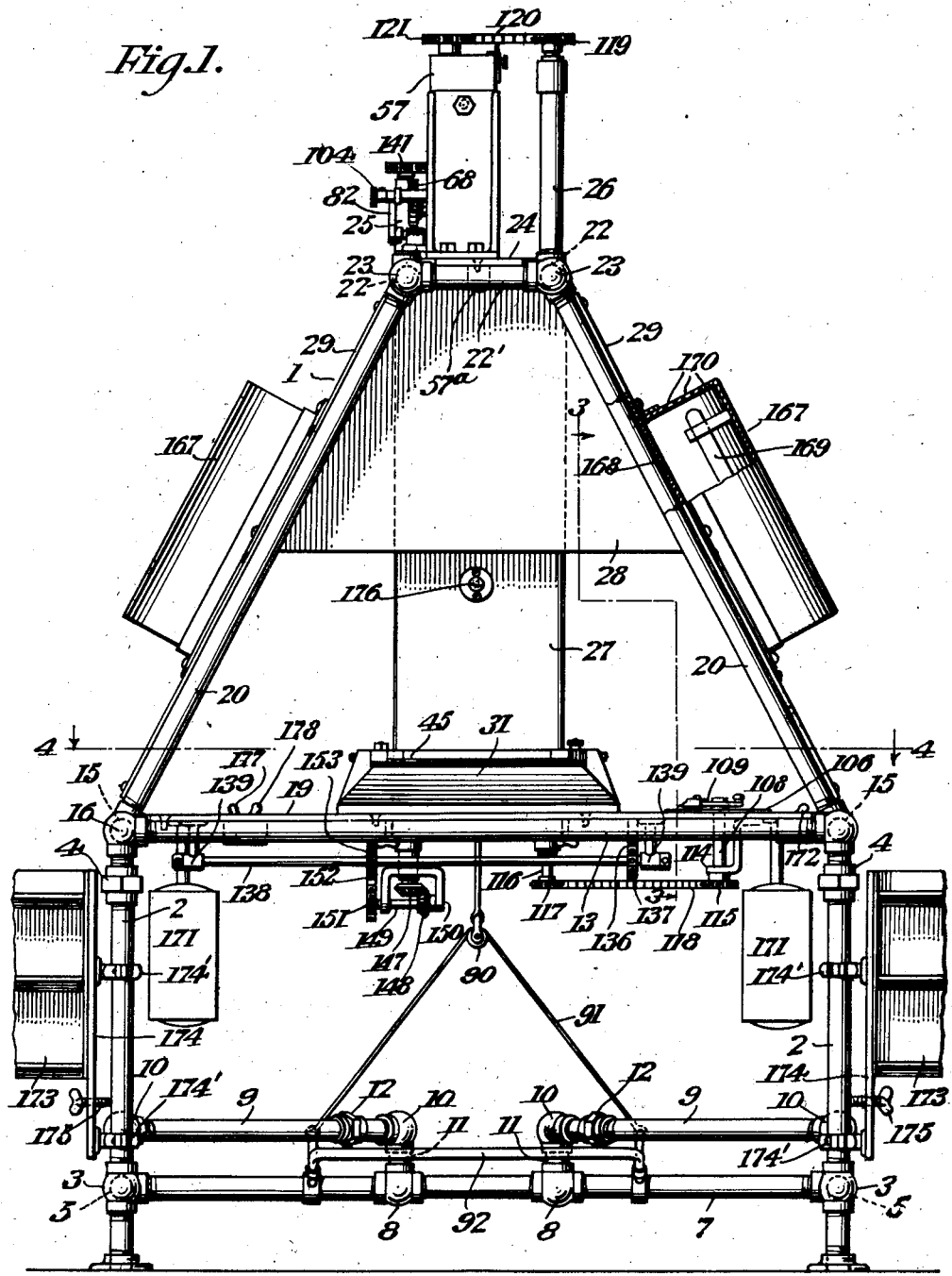

May 19, 1931. A. W. CARPENTER 1,805,511
APPARATUS FOR MAKING ANIMATED PICTURES
Filed June 18, 1927 8 Sheets-Sheet 1

INVENTOR
Arthur W. Carpenter.
BY
ATTORNEYS

May 19, 1931. A. W. CARPENTER 1,805,511
APPARATUS FOR MAKING ANIMATED PICTURES
Filed June 18, 1927 8 Sheets-Sheet 2
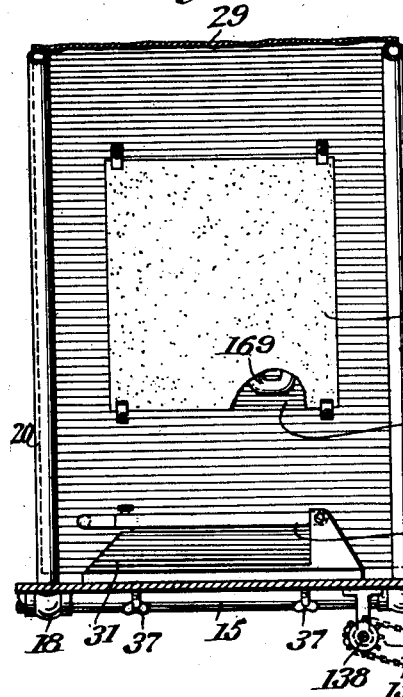
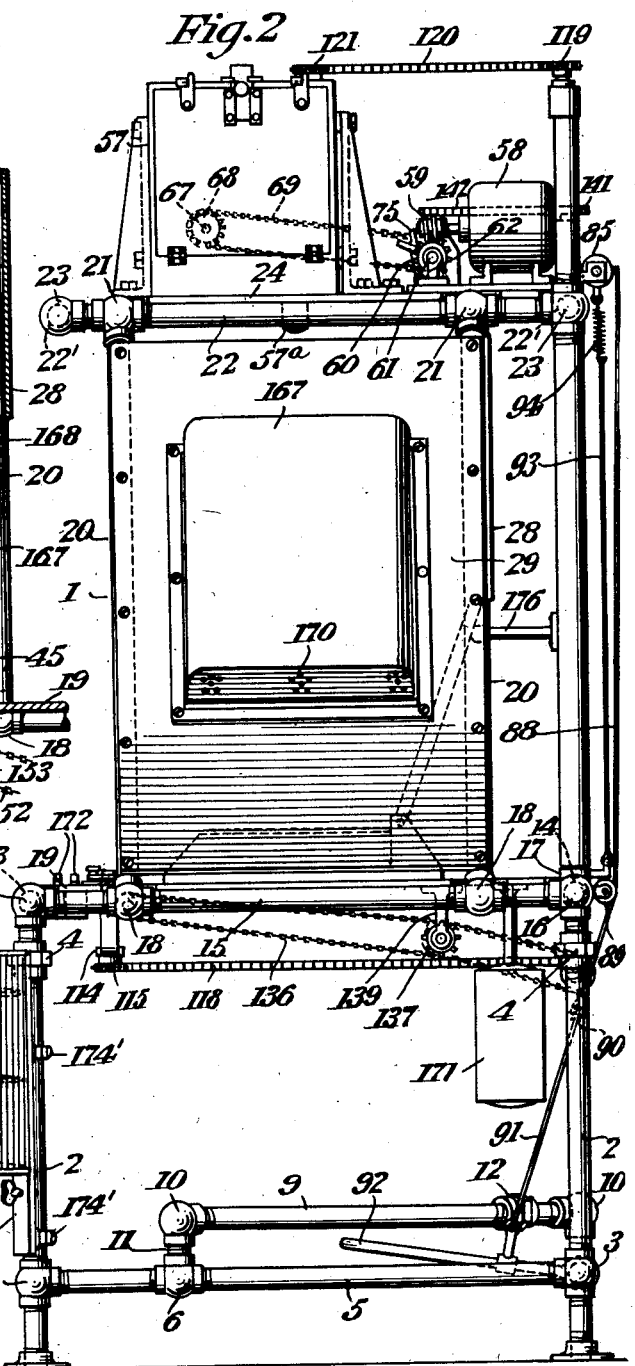
INVENTOR
Arthur W. Carpenter
BY
ATTORNEYS

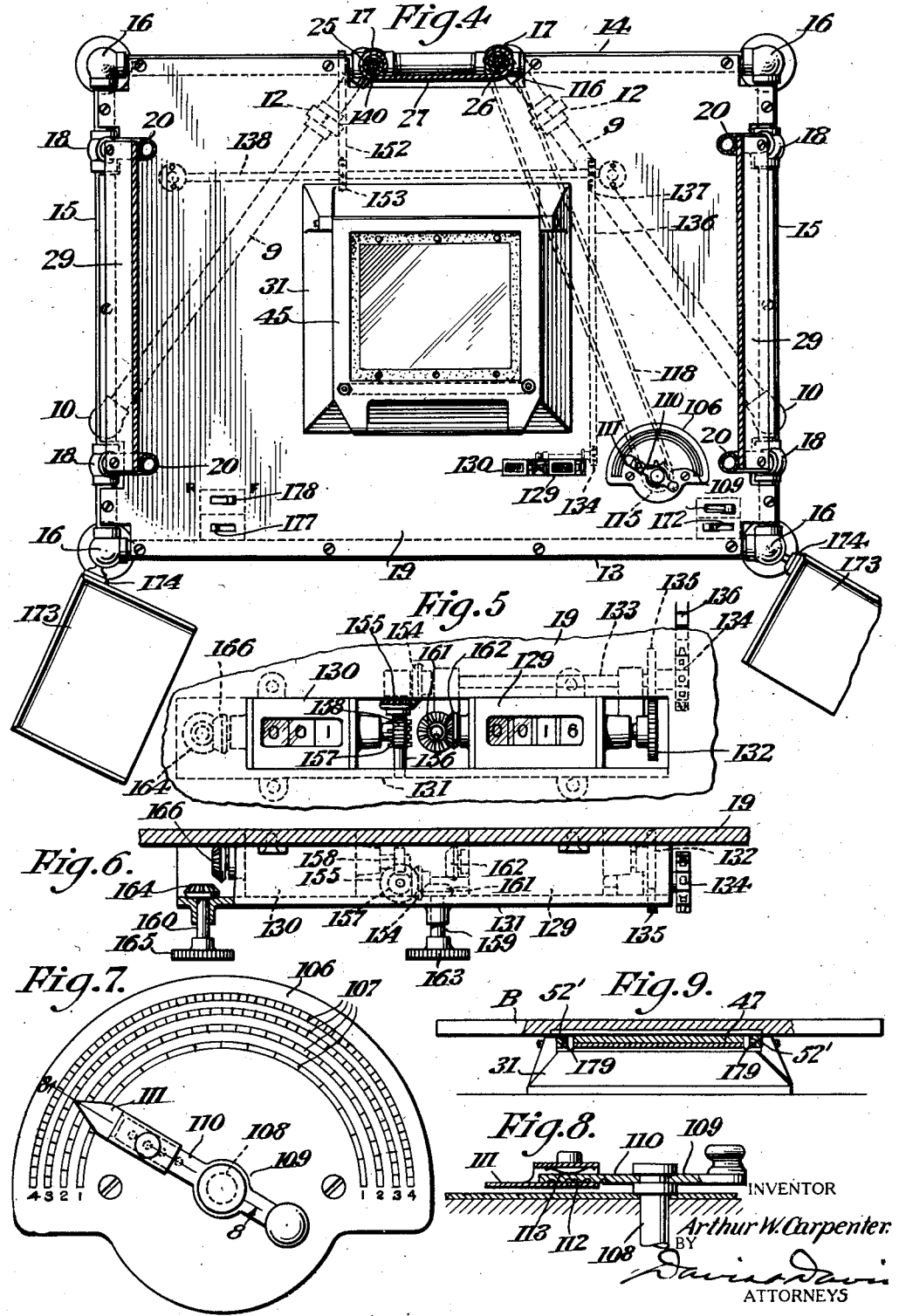

May 19, 1931.  A. W. CARPENTER  1,805,511
APPARATUS FOR MAKING ANIMATED PICTURES
Filed June 18, 1927   8 Sheets-Sheet 4
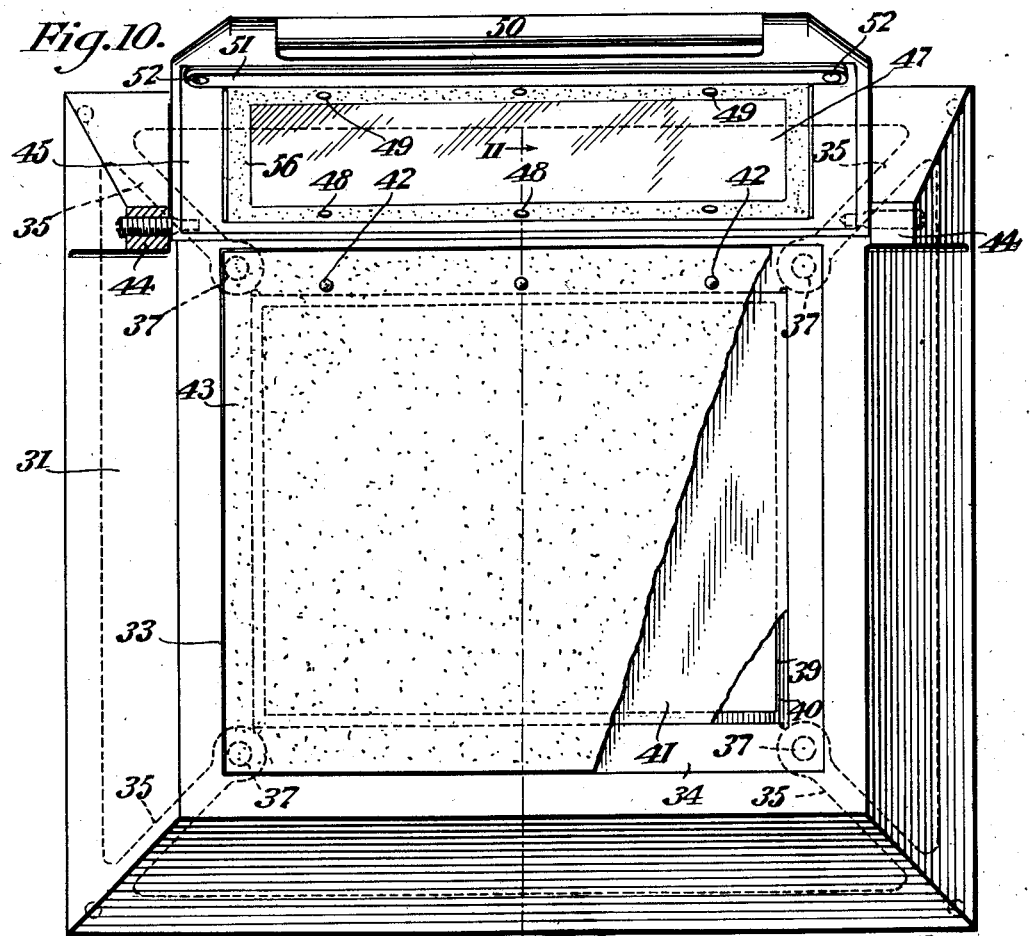
INVENTOR
Arthur W. Carpenter
BY
ATTORNEYS

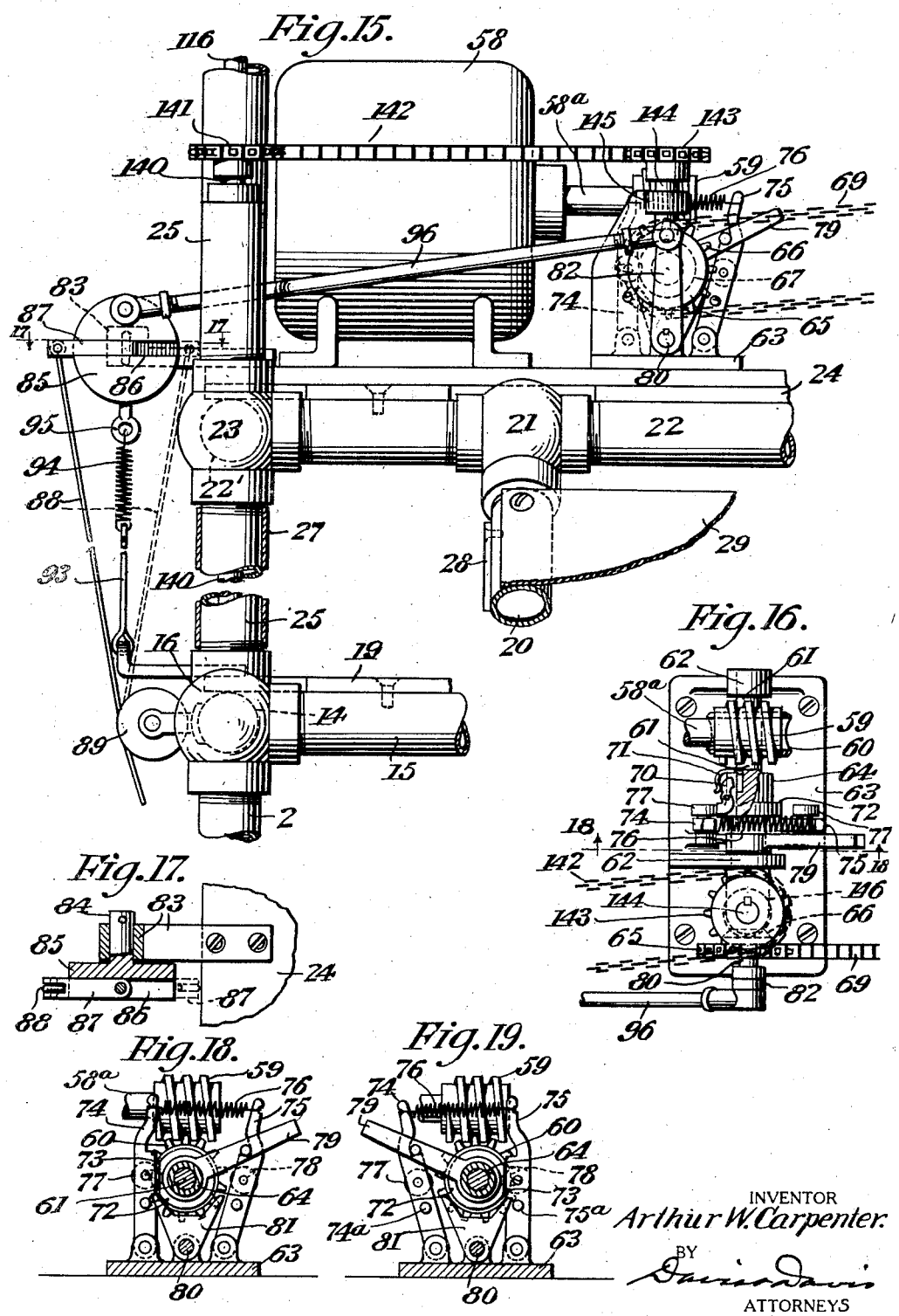

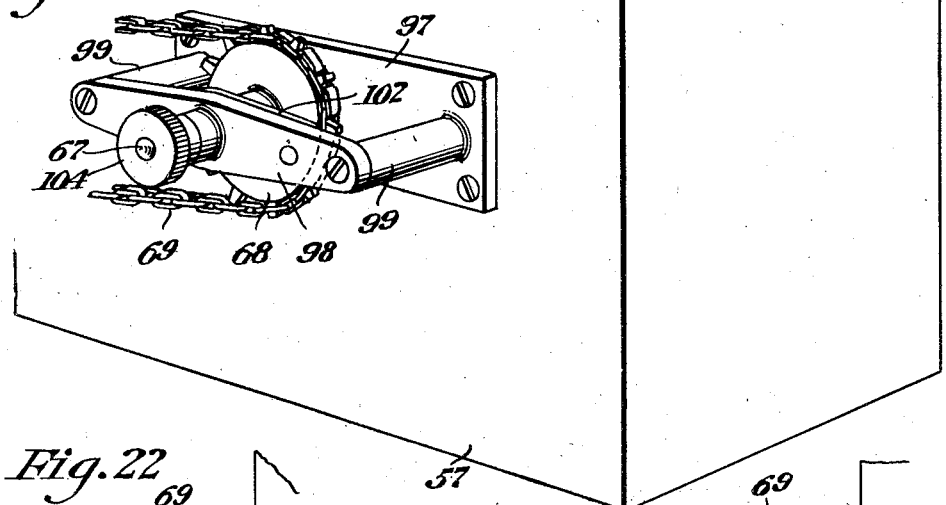
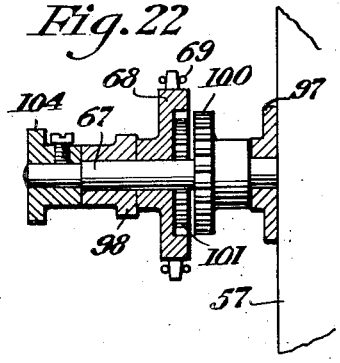
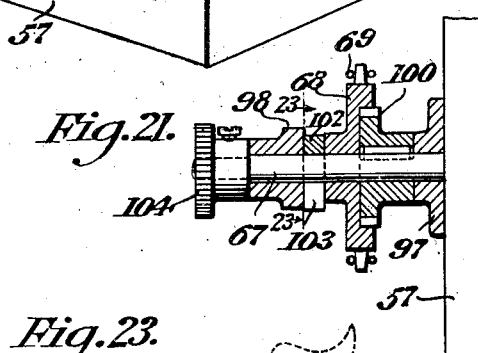
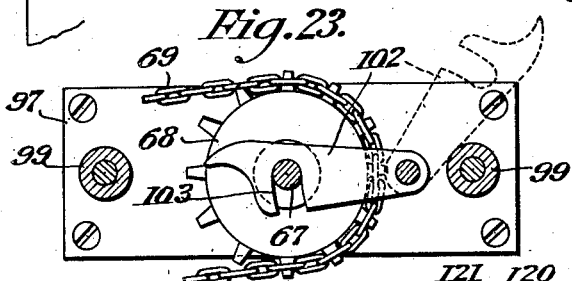
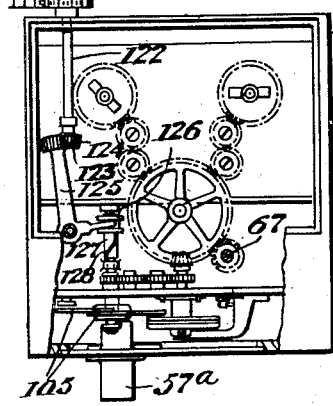
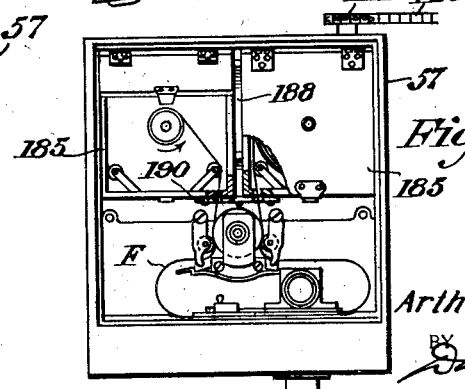

May 19, 1931.  A. W. CARPENTER  1,805,511
APPARATUS FOR MAKING ANIMATED PICTURES
Filed June 18, 1927  8 Sheets-Sheet 7
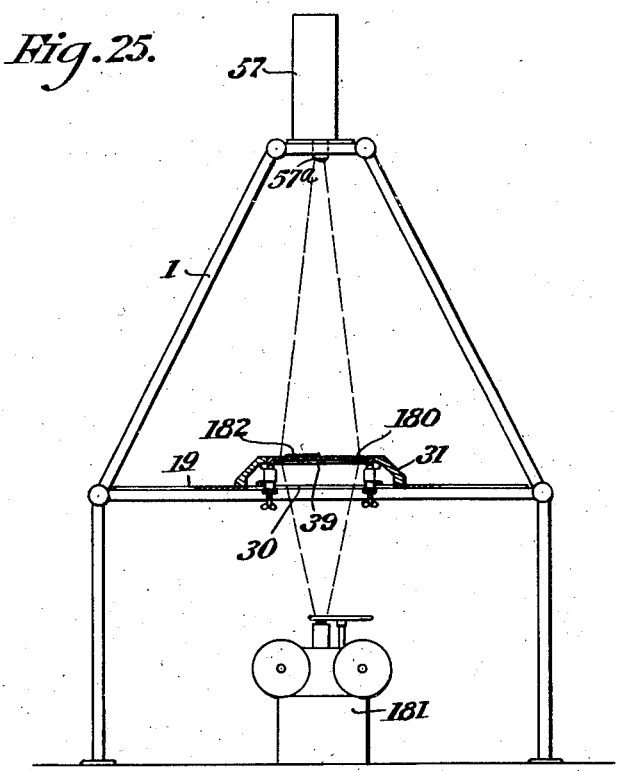
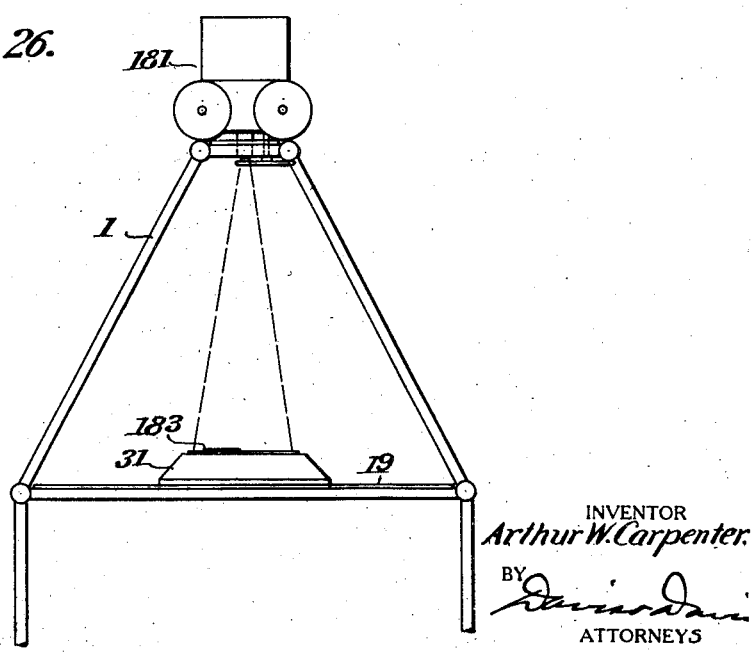
INVENTOR
Arthur W. Carpenter.
BY
ATTORNEYS May 19, 1931.  A. W. CARPENTER  1,805,511
APPARATUS FOR MAKING ANIMATED PICTURES
Filed June 18, 1927   8 Sheets-Sheet 8
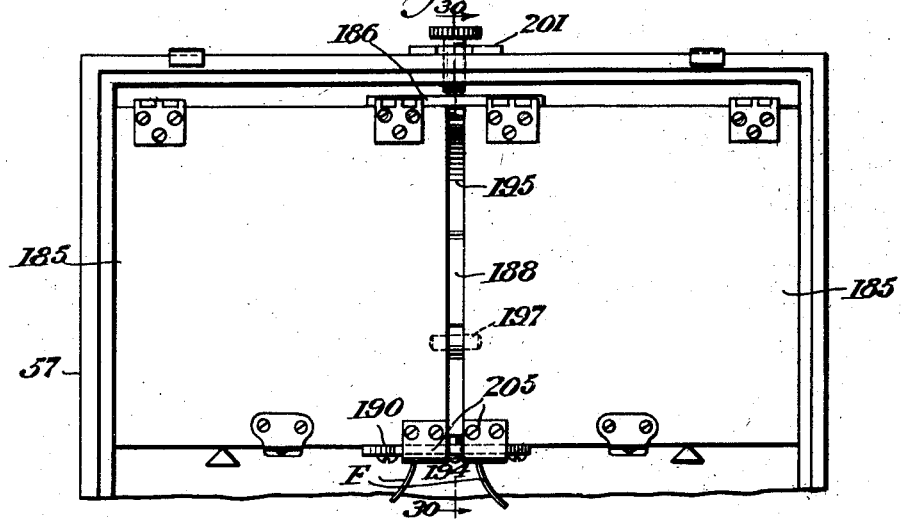
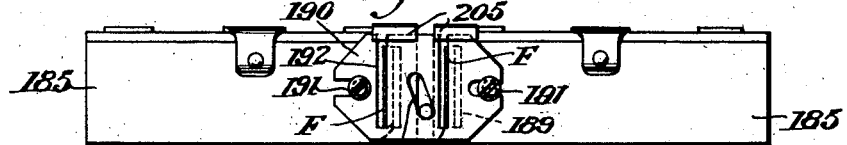
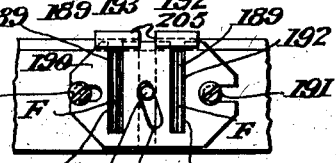
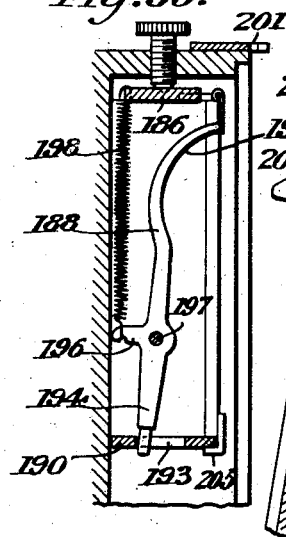
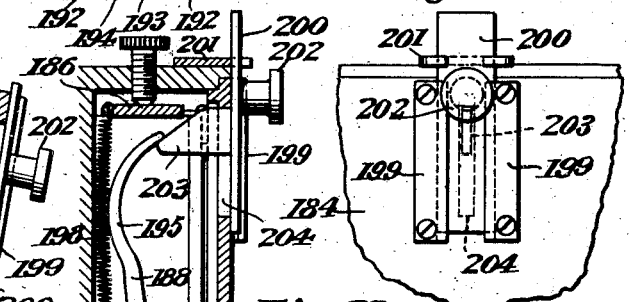
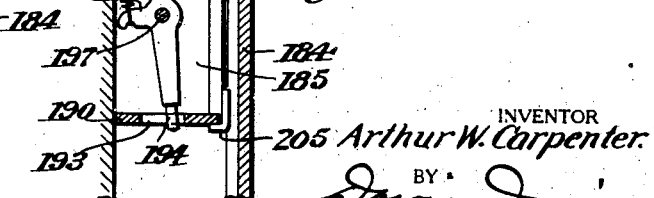
INVENTOR
Arthur W. Carpenter.
BY
ATTORNEYS Patented May 19, 1931

1,805,511

UNITED STATES PATENT OFFICE

ARTHUR WILTSEE CARPENTER, OF NEW YORK, N. Y., ASSIGNOR, BY MESNE ASSIGN-
MENTS, TO AUDIO-CINEMA, INCORPORATED, OF LONG ISLAND CITY, NEW YORK, A
CORPORATION OF NEW YORK

APPARATUS FOR MAKING ANIMATED PICTURES

Application filed June 18, 1927. Serial No. 199,798.

This invention relates to an apparatus for the production of that class of motion pictures known as "animated" pictures. In the making of a projection film for such pictures, a series of pictures are executed representing a moving object in advanced positions in successive pictures. These pictures are photographically reproduced upon the film in proper sequence so that when the film is projected the object will appear to move on the projection screen.

The main objects of the present invention are to improve the quality of the photography upon an "animated" film and to generally facilitate the performance of the large number of photographing operations required to produce such a film.

Other objects will appear hereinafter.

In the drawings:

Fig. 1 is a front elevation of the improved photographing apparatus;

Fig. 2 a side elevation of said apparatus;

Fig. 3 a vertical section taken on the line 3—3 of Fig. 1;

Fig. 4 a horizontal section taken on the line 4—4 of Fig. 1;

Fig. 5 a detail plan view upon a larger scale showing a counting device forming part of the apparatus;

Fig. 6 a front view of said counting device, partly broken away;

Fig. 7 a detail plan view of an index device for adjusting the camera shutter;

Fig. 8 a section taken on the line 8—8 of Fig. 7;

Fig. 9 a detail view showing the manner of mounting a drawing board in the apparatus as a support for a picture to be photographed;

Fig. 10 a detail plan view of the platen device for supporting a picture in the apparatus;

Fig. 11 a vertical section taken on the line 11—11 of Fig. 10 with the presser lid closed;

Fig. 12 a plan view on a smaller scale showing a different adjustment of the platen parts, and the manner of attaching a picture index thereto;

Figs. 13 and 14 enlarged detail sections taken on the lines 13—13 and 14—14 respectively of Fig. 12;

Fig. 15 is a side view showing the power transmission mechanism for operating the camera;

Fig. 16 a top plan view of the transmission mechanism with parts broken away;

Fig. 17 a detail section taken on the line 17—17 of Fig. 15;

Fig. 18 a section taken on the line 18—18 of Fig. 16 and showing one adjustment of the transmission mechanism;

Fig. 19 a similar view showing another adjustment of said mechanism;

Fig. 20 a perspective view of means providing for the manual rotation of the camera shutter independently of the power driven means;

Figs. 21 and 22 longitudinal sections of said shutter-rotating means showing two different adjustments thereof;

Fig. 23 a transverse section taken on the line 23—23 of Fig. 21;

Fig. 24 a side view of the interior mechanism of the camera;

Fig. 24ª a view of the opposite side of said interior mechanism;

Fig. 25 a diagrammatic view illustrating an adaption of the apparatus for carrying out a method of photographing animated pictures;

Fig. 26 a diagrammatic view illustrating another adaptation of the apparatus;

Fig. 27 a side view of the camera magazines mounted in the camera casing and provided with improved means for closing the film slots;

Fig. 28 a bottom plan view of the magazines showing the film slots closed;

Fig. 29 a fragmentary bottom plan showing the film slots opened;

Fig. 30 a vertical section taken on the line 30—30 of Fig. 27 with the camera door open;

Fig. 31 a similar view showing the camera door closed; and

Fig. 32 a fragmentary front view showing the fastening means for holding the door closed.

Referring by numerals to the various parts, the improved photographing apparatus includes a rigid, upstanding frame structure 1 formed of threaded pipe sections and unions. Certain of the pipe sections are disposed to form four upright corner posts or legs 2. Each post is formed of a plurality of sections connected by a threaded lower pipe union 3 and an upper threaded pipe coupling 4. Disk shaped feet members are threaded upon the lower ends of the posts 2. Extending between adjacent front and rear posts are two stiffening members 5 which are threaded at their ends into the lower unions 3. Each member 5 comprises two pipe sections joined by a union 6. A rear stiffening member 7 extends between the rear posts, is connected to the unions 3 of said posts and comprises three threaded pipe sections joined by unions 8. Extending between the side members 5 and the rear member 7 are two diagonally disposed stiffening members 9 connected to the unions 6 and 8 by means of threaded unions 10 and short pipe sections 11. Each diagonal stiffening member comprises two pipe sections joined by a threaded coupling 12. At the upper ends of the posts 2 are assembled a front frame member 13, a rear member 14 and side members 15 disposed to define a horizontal, rectangular table support, and connected to the posts by threaded unions 16. The front member 13 comprises a single pipe section. The rear member 14 is formed of three pipe sections connected by threaded unions 17, and each side member 15 comprises three pipe sections joined by threaded unions 18. Upon these four members is mounted a table 19 in the form of a metal plate secured to the members by screws.

From the side members 15 extend two upwardly converging pairs of spaced parallel frame members 20, each member comprising a pipe section threaded at its lower end into one of the unions 18. The upper ends of the members 20 are threaded into unions 21 forming part of a horizontal rectangular frame. This frame comprises side members 22 formed of threaded pipe sections joined by the unions and end members 22' each comprising a single pipe section. The side and end members are joined by corner unions 23 and provide a supporting frame for a camera supporting plate or platform 24 secured to said frame by screws. Joined to the unions 17 and to the two rear unions 23 are two vertical parallel rear members 25 and 26 formed of threaded pipe sections and extending above and below the unions 23 and 17 respectively. Between the tables or plates 19 and 24 the members 25 and 26 are connected by a sheet metal web 27 which is folded around said members at its edges. A sheet metal shield plate or web 28 is secured by screws to the rear ones of said upwardly converging members 20 and extends a material distance downwardly from the upper ends of said members. Secured by screws to each pair of members 20 is a sheet metal shield 29 which extends between the members of the pair for the greater portion of their length.

The pipe sections in the frame structure are formed with right and left hand threads at their opposite ends respectively. The frame may, therefore, be tensioned at any point by turning one of the pipe sections. The upper portion of the frame is properly tensioned when first assembled. When the various plates and sheets 19, 24, 27, 28 and 29 are secured in place this tension will be maintained. The lower part of the frame may be readily tensioned by applying a wrench to the couplings 12 in the diagonal members 9. By turning the couplings 4 the posts 2 may be longitudinally adjusted.

The table 19 is centrally formed with a rectangular opening 30 of material area. A platen structure for supporting a picture sheet, is mounted upon the table and extends over said opening. This platen structure comprises an outer, rigid, shell-like, rectangular metal frame 31 of material height which rests upon the table around the margin of the opening 30 and is secured in place by screws 32. The upper horizontal portion of the frame is formed to define a rectangular opening 33 materially smaller than the table opening 30. Removably and adjustably fitting within the opening 33 and of substantially the same area, is a rectangular inner platen frame 34. The outer frame 31 is formed at its four corners with webs 35 which extend diagonally inward to points beneath the corners of the frame 34. The inner ends of said webs are enlarged and each is formed with a vertical threaded aperture 36. Threaded upwardly through these apertures to points above the ends of the webs are four supporting and adjusting screws 37 which form posts upon which the platen frame 34 rests loosely and by means of which it may be adjusted vertically and levelled or inclined as desired. The screws extend a material distance below the table, are formed at their lower ends with wing heads, and have check nuts 38 threaded upon them and adapted to contact the under faces of the webs. The inner platen frame 34 is horizontal and defines a rectangular aperture 39, and the upper face of the frame is countersunk around the aperture to form a marginal ledge 40. A removable metal plate 41 fits neatly in the countersink of the frame and rests upon the ledge 40. This plate and the frame are both flat and their upper surfaces are flush with each other. The frame 34 carries a plurality of rigid, upstanding, peg-like centering projections 42 arranged in a row adjacent the rear edge of the plate 41. Resting upon the frame and the plate and covering the upper surfaces thereof is a rectangular pad 43 of compressible material such as soft rubber.

The outer frame 31 is formed adjacent its rear corners with two upstanding pivot ears 44. Hingedly supported between said ears is a substantially rectangular presser frame 45 which defines a rectangular aperture 46 larger than the area of the plate 41 and of sufficient size to include the upstanding pegs 42 and most of the pad 43 within its area. Rigidly mounted in the frame 45 to close said aperture is a thick, flat plate 47 of transparent glass. This plate and frame form a presser device which is adapted to fold down over the compressible pad 43. The under face of the plate projects beyond the face of the frame to contact with a pad.

The pad provides a support for a picture sheet and the upstanding projections 42 extend through openings in the pad and above the upper surface thereof to enter apertures formed in the picture sheet and hold the sheet centered and in a proper position upon the pad. Adjacent its rear edge the glass plate is formed with apertures 48 to provide clearance for the ends of the projections 42. The plate is also provided with similar apertures 49 adjacent its forward edge for a purpose which will be hereinafter set forth. At its forward edge the presser frame 45 is provided with a handle rod 50 for pressing the lid down.

To the under face of the presser frame 45 is secured a slightly flexible and resilient metal clip strip 51 which extends substantially the full width of the frame, alongside the forward edge of the glass plate. At its ends this strip is secured to the frame by bolts 52 which extend up through openings 52' in the frame and have nuts 53 threaded upon them. One of these nuts is of a form to be conveniently turned by hand so that said strip forms an adjustable resilient clip or holder extending substantially the full width of the frame. Interposed between the strip 51 and the frame is a spacing strip 54 of suitable material. The opposed faces of the two strips are substantially flush with the upper surface of the pad 43 when the presser device is folded down. The purpose of the clip strip 51 is to adjustably attach a picture element such as a pointer 55 to the presser frame, said pointer to extend between the glass and a picture sheet upon the pad. The strip may be readily loosened to permit the insertion of the index member by turning the hand nut 53. The picture sheet is photographed through the glass plate and in order to properly define an exposure aperture and exclude the margins of the sheet and the projections 42 from the photographed picture, an opaque coating 56 is applied to one or both faces of the glass plate around the margins thereof.

The plate 24 supported at the upper end of the frame structure forms a platform for the support of a motion picture camera 57. The camera is rigidly supported upon the platform with its lens 57ª directed downwardly toward the center of the platen structure. Mounted upon the platform 24, to the rear of the camera, is an electric motor 58 for operating the camera. A power transmission mechanism connects the motor and camera (Figs. 2 and 15). This mechanism includes a worm 59 keyed to the motor shaft 58ª and meshing with a worm gear 60. The gear 60 is keyed to a shaft 61 which is supported by bearings 62 extending upwardly from a plate 63 mounted upon the platform 24. A clutch sleeve 64 is rotatably mounted upon the shaft 61 and extends through one of the bearings 62. At one side of said bearing the sleeve 64 rigidly carries a sprocket wheel 65 and a bevel wheel 66 at one face of the sprocket wheel. The camera is provided with an operating or drive shaft 67 upon which a sprocket wheel 68 is mounted. As will be described later, the wheel 68 is normally connected to the shaft 67 to rotate with it. A driving chain 69 is trained around the sprocket wheels 65 and 68.

The sleeve 64 to which the wheel 65 is connected is provided with a shiftable key 70. This key is engaged by a spring 71 which tends to press it into a key slot in the shaft 61 and lock the sleeve to the shaft. The sleeve is formed with an enlarged circular cam face 72 a portion 73 of which is flattened. The key 70 is adapted to extend out through a slot in said flattened portion. A pair of clutch releasing rock arms 74 and 75 are disposed at opposite sides of the sleeve 64. The said rock arms extend above and below the sleeve are pivotally connected to the plate 63 at their lower ends and are connected together at their upper ends by a contractile spring 76. Rotatably carried by the rock arms are rollers 77 and 78 which are adapted to engage the cam face 72 at diametrically opposite points. One or the other of said rollers is always in engagement with the cam face. The other roller is held away from the cam face by a lock-out member 79 which is rockably mounted upon the sleeve 64 and adapted to be selectively engaged with either of the arms 74 or 75 to hold it away from the sleeve against the resistance of the spring 76. When either roller is in engagement with the flat portion 73 of the cam face it contacts with the key 70 and holds it out of engagement with the shaft 61. (Fig. 16). The motor then rotates the shaft through the worm and worm gear without affecting the sleeve 64 and its connected sprocket wheel 65 and bevel gear 66, and the camera drive shaft 67 is not rotated. When the said roller is moved free from the flattened portion of the cam face the spring 71 snaps the key into the shaft slot and locks the sleeve to the shaft. The camera will then be operated through the sprocket wheel 65 and the chain 69.

A short rock shaft 80 is mounted upon the plate 63 below the sleeve 64 and between the rock arms 74 and 75. Rigidly secured to said rock shaft is an upwardly extending bifurcated member 81 which is adapted to be rocked into engagement with pins 74ª, 75ª carried by the rock arms 74 and 75 to rock either arm away from the sleeve. An upwardly extending arm 82 is also rigidly secured to the rock shaft 80. Supported by the platform 24 and spaced outwardly from the rear edge thereof is a bearing 83 in which is mounted a short rock shaft 84. A disk 85 is rigidly carried by the shaft 84 and has a diametrically extending groove 86 formed in its outer face. Pivotally mounted at the center of the disk and extending radially outward in said groove beyond the periphery of the disk is a manually adjustable arm 87. To the outer end of the arm 87 is connected a cable 88 which leads downwardly, is trained over a pulley 89 carried by the frame, and is connected at its lower end to a pulley 90. A cable 91 is trained over pulley 90 and connected at its ends to a U-shaped treadle 92 rockably mounted upon the rear frame member 7. Another cable 93 is anchored at one end to the table 19 and at its other end is connected by means of a spring 94 to a downwardly extending eye 95 carried by the disk 85. Connected to the disk at a point located diametrically opposite the eye 95 is a reach rod 96 the opposite end of which is connected to the rock arm 82. The tension of the spring 94 normally holds the disk 85 in a position with the groove 86 and arm 87 disposed horizontally. In this position of the disk the treadle 92 is held elevated by the cable 88, the rock arm 82 is held vertical by the reach rod 96 and the bifurcated member 81 is held in a neutral position out of contact with the pins 74ª and 75ª. (Figs. 15, 18 and 19).

When the treadle is stepped upon, the member 81 is rocked to swing the arm 74, or the arm 75, away from the sleeve 64 and permit the key 70 to lock the shaft 61 to the sleeve and effect a driving connection between the motor and the camera. The camera will then be operated to make one exposure. The arm 87 is pivoted in the disk slot 86 to give it two adjustments as indicated in Figs. 15 and 17 and determine the direction in which the releasing member 81 is rocked when the treadle is depressed. When the arm is adjusted to the left as shown in Fig. 15, the member 81 will be rocked to the left to act upon the left roller-carrying rock arm 74 to free the roller 77 from the key 70. For this operation the lock-out arm 79 must be adjusted to lock out arm 75 and release arm 74. (Fig. 18.) When the arm 87 is adjusted to the right, as indicated, in dotted lines in Figs. 15 and 17, the member 81 will be rocked to the right to act upon the arm 75. For this adjustment of the arm 87 the lock-out arm 79 must also be adjusted to release the arm 75 and lock out the arm 74, as shown in Fig. 19. In this position of the arm 75, its roller 78 bears upon the cam face 72 and the rotation of the sleeve 64 will be automatically stopped when the flat portion of the cam face moves to a position under the roller. The purpose of the two adjustments of the arms 79 and 87 is to provide for the stopping of the camera either with the shutter closed or with it open as desired. In one of said adjustments the motor and transmission mechanism will cause a complete operation of the camera for each pressure upon the treadle and automatically stop the camera with its shutter closed. In the other adjustment a pressure upon the treadle will also cause a complete operation of the camera by the motor and transmission but the camera will be automatically stopped with its shutter open.

The camera shaft 67 is operatively connected to the camera shutter and to the film feed mechanism. It is frequently necessary for the operator to look through the camera lens in order to make a focusing adjustment thereof. For this purpose provision is made for manually rotating the shutter to an unobstructing position without starting the motor. To this end the sprocket wheel 68 is loosely mounted upon the shaft 67 to permit it to rotate independently thereof and slide longitudinally thereon. The shaft rotates in two bearings formed in two spaced plates 97 and 98. The plate 97 is secured to the outside of the camera casing and the plate 98 is rigidly connected to two rigid posts 99 extending outwardly from the plate 97. The sprocket wheel 68 is located between the two plates, and located between the said wheel and the inner plate is a gear 100 which is keyed to the shaft 67. This gear is adapted to mesh with internal gear teeth 101 formed in the inner face of the sprocket wheel. Between the sprocket wheel 68 and the outer plate 98 there is sufficient space to permit the said wheel to be moved axially out of mesh with the gear 100 as shown in Fig. 22. Normally, however, the wheel is locked in its inner or meshing position by a latch 102 which is pivoted to the inner face of the plate 98 at one side of the shaft and is formed with an arcuate slot 103 to adapt it to fold down around said shaft and fill the space between the sprocket wheel and the plate 98, as shown in Fig. 21. The sprocket wheel is then keyed to the shaft and it is impossible to manually turn the latter owing to the fact that the transmission mechanism, of which the sprocket wheel is a part, is locked by the drive worm 59 upon the motor shaft. The latch is formed to adapt it to be readily engaged and swung to its inoperative position, indicated by dotted lines in Fig. 23. In this position the latch rests upon one of the posts 99. The sprocket wheel may then be demeshed or unclutched from the gear 100 to free the shaft from the transmission mechanism and permit it to be manually turned to adjust the shutter. The shaft extends out beyond its outer bearing and has a knob 104 secured to it for manually turning it.

The camera shutter is formed with a plurality of blades 105 (Fig. 24) which are relatively adjustable to vary the amount of light admitted to the film for each exposure. This is in order to provide for the taking of "fade out" and "fade in" pictures. When it is desired to "fade out" a picture the shutter blades are expanded to a certain degree for each successive exposure to reduce the size of the exposure aperture and thus reduce the light step by step throughout the "fade out" series of exposures. To "fade in" a picture this operation is reversed.

These shutter adjustments are made in the present apparatus from a point adjacent the picture-supporting platen (Figs. 1, 4, 7 and 8). Upon the table 19, near the front edge thereof and adjacent the platen, is mounted a scale plate 106, marked with a plurality of semi-circular scales 107 each provided with graduations indicating different shutter adjustments. In the present instance four scales are shown respectively indicating the fade out of a picture in one, two, three and four feet of film. The standard number of exposures upon a foot of film is sixteen. Therefore the innermost, or one foot scale is divided into sixteen parts, the two foot scale into thirty-two parts, the three foot scale into forty-eight parts and the four foot scale into sixty-four parts. Rotatably mounted at the center of the scale plate is a vertical shaft 108 which extends downwardly through the table. An index member 109 is fixed to the shaft directly over the scale plate and is formed with a radially extending shank 110. The index member includes a point 111 slidably mounted upon the shank and carrying a catch 112 adapted to be snapped by the pressure of a spring 113 into any one of a row of notches formed in the shank, the said notches corresponding in number and spacing to the scales 107. The pointer may, therefore, be accurately adjusted to cooperate with any one of the scales by merely depressing the point and sliding it along the shank until the catch engages the appropriate notch.

Below the table the shaft 108 is supported in a bearing 114 and has a sprocket wheel 115 fixed to it. A shaft 116 extends throughout the length of the rear frame member 26 and is mounted to rotate in bearings carried by said member. At its lower end the shaft 116 has a sprocket wheel 117 fixed to it, and trained about said wheel and the wheel 115 is a chain 118. At its upper end the shaft 116 has a sprocket wheel 119 fixed to it. The wheel 119 is connected by a driving chain 120 to a sprocket wheel 121 fixed to a shaft 122 extending downwardly into the camera casing casing as shown in Fig. 24. A bevel gear 123 is fixed to the lower end of said shaft and meshes with an arcuate rack 124 carried by one arm of a bell-crank lever 125 pivotally mounted within the camera casing. The other arm of the lever engages in a grooved slide 126 mounted upon a shaft 127. The slide 126 engages in a helical groove 128 formed in said shaft. Therefore, when the index knob 109 is turned the shaft 122 will be rotated, the lever 125 will be rocked and the slide 126 will be moved along the shaft 127 to a degree dependent upon the movement of the index above the scales 107.

The movement of the slide 126 will rotate the shaft 127 and shift the shutter blades relatively to each other. When the index is rotated toward the right the shutter blades will be expended and when rotated in the opposite direction they will be contracted. In photographing a "fade out" series of pictures the index pointer is adjusted to one of the scales and stepped forward one graduation for each exposure. The various parts in the operative connection between the index and the shutter blades are so designed as to ensure an adjustment of the blades corresponding to the scale graduations. It will be understood, of course, that the number of scales and the graduations thereof may be varied to suit different requirements.

Supported by the table 19 adjacent to the platen and to the scale plate 106 are a pair of counting devices 129 and 130. (Figs. 4, 5 and 6). These devices are for the purpose of registering respectively the number of exposures made and the number of feet of film which have been exposed. Each device comprises a casing formed with an upwardly directed window through which the members are visible. The two devices are mounted upon a support 131 secured to the under side of the table and are directed upwardly through an opening in the table. The device 129 for registering the number of exposures is provided at one end with an operating gear 132. Rotatably mounted upon the support 131 is a shaft 133 upon which is fixed a sprocket wheel 134 and a gear wheel 135 which meshes with the gear 132. The sprocket wheel 134 is connected by means of a driving chain 136 to a sprocket wheel 137 fixed to a shaft 138. This shaft is supported in depending bearings 139 located toward the rear edge of the table. Extending through the vertical rear frame member 25 is a shaft 140 mounted to rotate in bearings in said member. Fixed to the upper end of the shaft 140 is a sprocket wheel 141. This wheel is connected by a driving chain 142 to a sprocket wheel 143 fixed to a vertical shaft 144 mounted to rotate in a bearing 145 supported over the plate 63. Also fixed to the shaft 144 is a bevel gear 146 which meshes with the gear 66 carried by the sleeve 64. A rotation of said sleeve will therefore also cause the shaft 140 to be rotated. Fixed to the lower end of the shaft 140 is a gear 147. This gear meshes with a bevel gear 148 fixed to a short shaft 149 which is rotatably mounted in a depending bearing yoke 150. This yoke is supported by the lower end of the frame member 25. Also fixed to the shaft 149 is a sprocket wheel 151 which is connected by a driving chain 152 to another sprocket wheel 153 fixed to the shaft 138. Since this shaft also carries the sprocket wheel 137 connected to the counting device 129, each rotation of the sleeve 64 for an exposure operation of the camera will cause the counting device to register.

The shaft 133 alongside the counting devices also has a bevel gear 154 fixed to it and meshing with a gear 155. The latter gear is fixed upon a shaft 156 rotatably supported by the support 131 and having a worm 157 fixed to it. The worm meshes with an operating gear 158 with which the footage counter 130 is provided. The transmission gearing between the sleeve 64 at the top of the frame and the counting device 129 is so designed that for each exposure operation of the sleeve the counting device will register one unit. The gearing between the shaft 133 and the counting device 130 is designed so that said device will register one unit each time one foot of film has been exposed. Since each foot of film accommodates sixteen exposures the device 130 will register only one unit for each sixteen units registered by the device 129.

Rotatably supported by the counter support 131 are two short vertical shafts 159 and 160. Fixed to the shaft 159 is a bevel gear 161 adapted to mesh with a gear 162 with which the exposure counter 129 is provided. The shaft 159 is slidably supported and is provided with an operating knob 163 at its lower end. Normally the shaft gravitates to its lower position so that its gear 163 is out of mesh with the counter gear 162. This gearing is provided for clearing the counting device. By elevating the shaft to mesh the gears, and then turning knob the device is cleared of numbers and restored to zero. The shaft 160 is also slidably supported and carries a similar gear and knob 164 and 165 respectively. This gear 164 is adapted to be moved up into mesh with a gear 166 with which the footage counter is provided. By turning the knob the footage counter is then restored to zero. Thus either counting device may be cleared of numbers independently of the other.

Each sheet of plate 29 mounted upon the upwardly converging frame members 20 is formed with a rectangular central opening. Mounted upon the outer side of each plate 29 to cover said opening is an opaque hood-like casing 167. This casing is slightly larger than the plate opening and is secured to the plate around the margins of the opening. Extending entirely across the area of the opening and concealing the interior of the casing is a rectangular translucent glass plate 168. (Fig. 1). This plate is preferably of the kind known as "flash opal" glass. Mounted within the casing is a mercury vapor lamp 169. The glass plate is preferably removably mounted to give access to the lamp. At its upper and lower ends the casing 167 is formed with ventilating openings 170 to conduct the heat of the lamp away from the glass plate and thus divert it from an operator at the platen and enable him to work in more comfort. The casing, the glass plate and the enclosed lamp from a lighting unit to illuminate a picture placed upon the platen to be photographed. There are two of these units located at opposite sides of the platen and directed downwardly and inwardly. They are supported by the upwardly converging frame members at such an angle as to fully illuminate a picture upon the platen and still avoid an objectionable reflection of light to the camera from the glass presser plate 47 through which the picture is photographed. The translucent plates 168 cause a proper diffusion of light rays, protect the operator from the glare of the lamps and also shield him from the heat. Electrically connected to each lamp is a current regulating device 171 known as an "auxiliary". These devices are supported by the table at the underside thereof. Switches 172 are mounted upon the table for opening and closing the lamp circuits.

Two picture-holding units 173 are mounted upon the front posts 2 of the frame to swing horizontally. Each unit comprises a plurality of vertically spaced shelves rigidly attached to a vertical strip 174. This strip is attached to the frame post by two vertically spaced, split ring members 174' which are slidable vertically along the post to position the unit at different heights. A set screw 175 is threaded through the strip to engage the post and hold the unit in any adjusted position.

*Operation*

The apparatus is operated to photograph a series of animated pictures upon a film as follows:

The series of unphotographed pictures are placed upon one of the shelf units 173. The presser device of the platen is swung back to rest upon a rubber tipped stop 176 mounted upon the rear web 27 of the frame. The first picture sheet is placed upon the compressible pad of the platen with the rigid projections 42 extending through the apertures of the sheet. These apertures and projections are designed to accurately center the sheet with relation to the camera lens. The presser device is then lowered and the glass plate 47 is pressed against the picture sheet to flatten it against the pad. In order to obtain the best results it is extremely important that the sheet be pressed absolutely flat owing to the fact that even a very slight bulge in the sheet will be registered in the exposure and appear very conspicuously in the greatly magnified projected picture. Many of the pictures are executed upon sheets of transparent celluloid having a bright reflecting surface, and a bulge therein will create a high light which is reflected into the camera lens.

It is a standard practice in photographing animated pictures to superpose several pictures for a single exposure. For example, a base picture representing a background is first placed upon the platen and then a series of pictures representing a moving object in different positions are placed in proper sequence upon the base sheet and photographed successively with it. In such cases it is ordinarily extremely difficult to flatten out both superposed pictures. The present platen structure has been designed to accomplish this with a minimum exercise of effort and care on the part of the operator. To this end the platen structure is provided with the compressible pad 47 and the adjustable support for said pad. This support is independently adjustable at each of its four corners to bring the picture sheets into proper relation to the glass presser plate and compensate for sheets made of different stock and different area. Owing to the cooperation of the compressible pad and the adjusting means only a slight pressure is required to entirely flatten the sheets, the mere weight of the presser device or lid being often sufficient to hold them flat while they are photographed.

The platen structure also renders it possible to use the index member or pointer 55 as shown in Fig. 12. This member is inserted beneath the retaining strip 51, clamped in place by the nut 53, and folded down with the lid to overlie a picture and form part of it. It is frequently desirable to use a pointer in a scientific or educational picture to direct attention to a particular object or spot throughout a series of pictures. After an exposure of the picture the lid is raised and the picture removed. The pointer is carried by the lid and is swung with it clear of the picture. If the pointer is to follow up a moving object it may be shifted to the proper degree for each successive picture. By using a single pointer in this manner the labor of executing a representation of a pointer upon perhaps hundreds or thousands of successive pictures is avoided. The platen structure provides for the flattening of the pointer and the sheet which it overlies.

When one or more pictures have been flattened upon the platen, the operator steps upon the treadle to connect the motor to the camera for operating the latter as previously described. A switch 177 is mounted upon the table for opening and closing the motor circuit. The motor is controlled for forward and reverse driving by a switch 178 conveniently located beside the switch 177. It is frequently desirable to run the film backward to create certain effects, particularly a "dissolve" effect wherein one view disappears by degrees throughout a series of pictures simultaneously with the appearance of another view superposed upon the first. The picture upon the platen is photographed through the glass presser plate and when the desired number of exposures have been made the lid is raised and the picture is removed and placed in the shelf unit located at the opposite side of the apparatus from the unit containing the unphotographed pictures, to prevent the pictures from becoming mixed. The entire series of pictures is photographed in this manner, each exposure being registered by the device 129 and each foot of film being registered by the device 130. These devices are conveniently located directly beneath the eye of the operator and in a position to be illuminated by the lighting units. The shutter adjusting means 106—112 is also conveniently located and well illuminated.

In order to produce various animated effects and also to reduce the enormous amount of labor required in the making of an animated picture the operator at the camera frequently resorts to clever juggling of the pictures to various positions upon their support. It is often particularly desirable to reverse a picture from front to rear. For this reason, in the present apparatus, the picture support (including the frame 34, the plate 41 and the pad 43) is loosely mounted and reversible as a unit to the position indicated in Fig. 12. The picture engaging projections 42 are now disposed at the front edge of the platen to hold the picture sheet in a reversed position. The glass presser plate 47 is provided with the forwardly located apertures 49 to provide clearance for the projections 42 in this position. Thus in either position of the picture support the presser plate will bear upon the entire surface of the picture sheet and flatten its entire area.

It may be desirable occasionally to provide a larger field than the platen will permit. In that case the platen lid is closed and a drawing board "B" or like support placed upon the lid as shown in Fig. 9. In order to properly position said board with relation to the camera, the under face of the board is provided with two rigid projections 179 spaced and formed to enter the holes 52' in the frame of the platen lid, through which the bolts 52 tend. These bolts and the strip 51 are removed and the projections 179 inserted.

In Fig. 25 is diagrammatically shown an adaptation of the apparatus for carrying out a method for simultaneously forming and photographing a picture. In this method, the compressible pad of the platen and the supporting plate 41 therefor are removed and a plate 180 formed of translucent glass is inserted to take the place of the removed plate. A projecting machine 181 is placed beneath the said translucent plate and directed upwardly. The frame 1 and the platen structure are designed to provide clearance for the projector and also to leave the plate 180 unobstructed from the point of view of the projector. A film containing a series of base pictures is placed in the projector and said pictures are projected one at a time upon the translucent plate 180. Each projected picture will be visible at the upper face of the plate and will serve as a base upon which a picture element 182 representing a moving object or the like may be superposed. The projected base picture and the superposed picture element are then photographed together upon a film within the elevated camera 57. A series of projected base pictures are in this manner photographed and the picture element 182 is advanced in successive pictures across the view to produce an animated effect. This method avoids the labor of making a series of base or background pictures for the moving object. It also makes it possible introduce an animated object into a motion picture which was not originally prepared for that purpose.

In Fig. 26 is diagrammatically shown a use of the apparatus for carrying out another methor of animated picture production. The camera is here removed and a projecting machine is placed upon the elevated platform to occupy the position of the camera. Any suitable means is placed upon the platen structure to serve as a projection screen 183 in line with the projector. A film containing a series of base pictures is placed in the projector and projected upon the screen. Upon the projected picture as a base an animated picture is executed. A series of animated pictures may be thus made showing the object advanced in successive pictures, the projected base pictures serving as a guide for executing and positioning the animated elements.

The structure of the camera 57 is designed to prevent the exposure of the film when the casing is opened. (Figs. 27–32). The camera casing is provided with a door 184 to give access to the interior thereof. Removably mounted within the upper portion of the casing are two box-like magazines 185 to house the film reels. These boxes 185 are rigidly connected together at the top by a metal plate 186 which holds them in slightly spaced relation. Pivotally mounted at 197 between the boxes is a lever 188 disposed substantially vertically. At their under sides the boxes are formed with film slots 189 located adjacent the gap between the boxes. This gap is bridged by a slide plate 190 designed to cover the slots 189. The slide plate is held to the under side of the boxes by screws 191 extending through its ends and said ends are slotted to permit the slide to shift back and forth transversely of the gap and the slots 189. Film slots 192 are formed in the slide and are adapted to register with the slots 189 in one position of the slide. Between the slots 192 the slide is formed with a diagonal cam slot 193 which opens into the gap between the magazine boxes. The lower end 194 of the lever 188 extends down through the slot 193 to make an operative connection with the slide. The upper end 195 of the lever extends to a point adjacent the top of the boxes and is forwardly curved. The lever is also formed with an arm 196 which extends rearwardly from the lever pivot or fulcrum 197. A contractile spring 198 connects the arm 196 to the top plate 186 and tends to swing the lever to the position shown in Fig. 30 with its lower end shifted rearwardly and its upper end shifted forwardly. In this position of the lever its operative connection with the slide 190 holds the latter in its left hand position, as shown in Fig. 28, due to the angular arrangement of the slot 193. In this position of the slide the magazine slots are closed and the film "F", where it emerges from said slots, is folded against the under sides of the boxes by the slide and passes out through the slots 192 which are out of alinement with the slots 189. The film within the magazine boxes is then protected from the light and it is safe to open the camera door.

The camera door is hinged to the casing at its lower edge. The door, upon its outer face and adjacent its upper edge has two parallel vertical guides 199 secured to it. Mounted to slide between the said guides is a bolt 200 which when moved upwardly is adapted to pass through a slotted keeper plate 201, secured to the top of the camera casing, and hold the door closed. The bolt is provided with a knob 202 for shifting it. Rigidly carried by the bolt intermediate its length is a cam projection 203 which extends inwardly through a slot 204 in the door and into the space between the magazine boxes to a point where it is opposed to the curved end 195 of the slide-operating lever. In the retracted position of the bolt the cam projection is out of contact with the lever and the slide remains in its closed position. When the bolt is shifted upwardly, however, to fasten the door the cam projection is designed to wipe along the forwardly curved portion of the lever and rock the lever to the position shown in Fig. 31. This movement of the lever shifts the slide to the right to register the slots 189 and 192, as shown in Fig. 27, to permit the film to pass freely. When the door is to be opened the bolt must first be retracted. This releases the lever and permits the spring to instantly rock it and shift the plate 190 to its slot-closing position. There is no danger of an exposure of the film within the magazine when the door is opened. Therefore the door may be opened with perfect safety for the purpose of adjusting the camera mechanism or removing the magazine boxes. When the boxes are removed the film slots remain closed. Each box is provided with a hinged door and each door is provided at its lower edge with a guide member 205. These guide members engage one edge of the slide 190 and help to support it closely against the under faces of the boxes.

It will be seen that the photographing apparatus has been designed throughout to facilitate the extremely laborious work of photographing the great number of pictures required to produce an animated film. It is designed also to improve the quality of the photography. The entire apparatus is in the form of a compact unit which may be moved about a studio without disarranging any of the mechanisms. It is also designed to be operated by a single operator who remains at one point in front of the apparatus, is protected from the heat and glare of the illuminating means, and has the various operating members of the apparatus within easy reach and directly under his observation.

What I claim is:

1. In a picture photographing apparatus, means to support a picture sheet for photographing it, comprising an outer frame defining a rectangular opening; a rectangular inner frame removably fitting in said opening and defining a rectangular aperture, the inner frame being formed with a countersunk ledge at the edges of its aperture; a flat plate supported by said ledge and closing the aperture; independently adjustable supporting posts threaded upwardly through the outer frame and loosely supporting the inner frame adjacent its four corners; a plurality of upstanding projections carried by the inner frame adjacent one edge of said plate; a pad of compressible material extending over the plate and the inner frame and formed with openings to receive said projections, the projections extending through the pad to enter openings in a picture sheet upon the pad and hold the sheet in place; a frame hinged to one side of the outer frame to fold down over the top thereof; and a glass presser plate carried by said hinged frame to flatten the picture sheet against the pad, the inner frame being reversible from front to rear and the glass plate being formed with openings to provide clearance for the said projections in either position of the inner frame.

2. In a picture photographing apparatus, means to support a picture sheet for photographing it, comprising a frame defining an opening; a flat plate disposed in said opening; independently adjustable supporting posts threaded upwardly through the said frame and loosely supporting the said plate adjacent its edges; a plurality of projections supported with the plate and extending upwardly adjacent one edge thereof; a pad of compressible material extending over the plate and supported by it and formed with openings to receive said projections, the projections extending upwardly through the pad to enter openings in a picture sheet upon the pad and hold the sheet in place; and a glass presser plate hinged to one side of the outer frame to fold down and flatten the picture sheet against the pad, the pad-supporting plate and projections being reversible from front to rear and the glass plate being formed with openings to provide clearance for the said projections in either position of the inner frame.

3. In a picture photographing apparatus, means to support a picture sheet for photographing it, comprising a rigid plate; means shiftably supporting said plate; a pad of compressible material extending over said plate and supported by it; means supported with the plate to hold a picture sheet upon the pad against lateral displacement; and a glass presser plate hingedly mounted adjacent one edge of said pad and adapted to fold down over the pad and flatten the picture sheet against it, said rigid plate, pad and sheet-holding means being reversible as a unit from front to rear and the glass plate being formed to provide clearance for the sheet-holding means in either position of said unit.

4. In a motion picture photographing apparatus a rotatably mounted member adapted to be manually operated to adjust a camera shutter; a plurality of scale extending concentrically around the axis of said adjusting members and each provided with a series of graduations indicating different shutter adjustments, the graduations of the scales being differently spaced; a radially adjustable pointer carried by said shutter-adjusting member and adapted to be adjusted to cooperate with any one of said scales; and an operative connection between the shutter-adjusting member and the shutter blades of the camera to relatively adjust said blades.

5. An apparatus for photographing animated pictures comprising a frame; a picture support carried by the frame to support a picture sheet; a camera support carried by the frame to support a motion picture camera spaced from the picture support and directed toward the sheet; a normally inoperative power transmission mechanism carried by the frame to connect a motor to the camera to effect the film feed and shutter operation thereof; means shiftable at will to render the transmission means operative for taking a photograph; automatic means to limit the camera operation to a single exposure after an operation of said shiftable means; and manually adjustable means to cause the camera to stop automatically in either shutter open position or shutter closed position after an operation of the shiftable means.

6. A camera comprising a casing having a door; a pair of film magazines removably mounted in said casing and formed with slots for the passage of the film; a slide mounted upon said magazines and adapted to open and close the film slots of both; a rockable member mounted between the magazines and operatively connected to said slide; a shiftable locking device carried by the door to hold it closed; and means carried by said locking device to engage and rock said rockable member and move the slide to uncover the film slots when the device is moved to locking position; and means to automatically move the slide to close the slots when the locking device is retracted to unlock the door.

7. A unitary apparatus for photographing animated pictures comprising a rigid, upstanding frame; a picture support carried by said frame intermediate the height thereof and adapted to support a picture sheet directed upwardly; a camera support carried by the frame above the picture support to hold a motion picture camera directed downwardly toward the supported picture sheet; illuminating means carried by the frame and disposed to illuminate the supported picture sheet; power operated means carried by the frame to drive the camera; foot-operated means to control said camera-driving means; and means carried by the frame and manually operable from a point adjacent the picture support to relatively adjust the shutter blades of the camera for "fade out" and "fade in" photography.

8. In a picture photographing apparatus, means to support a picture sheet for photographing it, comprising a rigid support; a flat, compressible, rubber pad supported by said support and formed with a smooth, flat surface to receive a picture sheet against it; a flat, transparent glass presser plate shiftably mounted for pressing and flattening a picture sheet against the smooth surface of the pad, whereby the flattened picture may be photographed through the plate; adjustable supporting means for said rigid pad support to adjust the latter toward and from the glass presser plate for a proper cooperation of the pad with said plate to flatten the picture sheet; and sheet-holding means to properly position the picture sheet upon the pad with reference to the presser plate.

9. In a picture photographing apparatus, means to support a picture sheet for photographing it comprising a flat, rigid support; a rigid frame; a plurality of posts threaded through said frame and adjustably supporting said flat support adjacent the corners thereof; a flat, compressible, rubber pad supported upon the rigid, flat support and formed with a smooth, flat surface to receive the picture sheet against it; and a flat, transparent, glass presser plate hinged to the rigid frame at one side of the pad and adapted to fold over the pad and flatten a picture sheet against it, the threaded posts being adapted for bodily and tiltably adjusting the rigid pad support toward and from the presser plate to bring the pad into a proper cooperation with the plate.

10. In a picture photographing apparatus, means to support a picture sheet for photographing it comprising a flat, rigid support; a flat, compressible, rubber pad supported by said rigid support and formed with a smooth, flat face to receive a picture sheet against it; a flat, transparent, glass presser plate hinged to fold over the pad and flatten the picture sheet against it; means to relatively adjust the pad and the plate to obtain a proper co-operation of their opposed surfaces to flatten the sheet; and sheet-holding and positioning means to properly position the sheet upon the pad face with relation to the presser plate, whereby the picture may be photographed through the plate in proper position.

11. In an animated picture making apparatus, means to support a picture sheet for photographing it comprising a flat, rigid frame defining an opening; means for adjusting and positioning said rigid frame; a flat, rigid plate removably supported by the frame, flush with the latter and closing the opening; a flat, compressible, rubber pad removably supported by the flush surfaces of said frame and plate and formed with a flat, smooth face to receive a picture sheet against it; a shiftable, flat, transparent glass presser plate to cover the picture sheet and flatten it against the pad; and means carried by said frame to position and hold the picture sheet upon the pad for photographing the picture through the transparent presser plate.

12. An apparatus for making animated pictures comprising an upwardly directed support for a picture sheet; means to support a camera over said support and directed downwardly toward the picture sheet; an illuminating unit disposed at one side of said picture support and extending above it, comprising a casing, a lamp within the casing, a plate formed of material admitting the passage of light directed toward the upper surface of the picture support, and a marginal heat shield extending around said light-admitting wall, the casing being formed with ventilated openings outwardly of said shield away from the picture support, whereby the wall and the shield will protect an operator at the picture support from the heat of the lamp.

13. A unitary apparatus for making animated pictures comprising a rigid, upstanding, self-supporting frame structure; an upwardly directed picture support carried by the frame structure intermediate the height thereof; a camera support rigidly carried by the frame above said picture support to hold a downwardly directed camera; and a pair of illuminating units located at opposite sides of the picture support and extending above it, each unit comprising a casing, a lamp in the casing, a plate formed of material admitting the passage of light forming one wall of the casing directed toward the upper surface of the picture support, and a marginal heat shield extending around said light-admitting wall, the casings of the two illuminating units being formed with ventilating openings located outwardly of the shields away from the picture support, whereby the said shields and light-admitting walls of the two units protect an operator at the picture support between the units from the heat of the lamps.

14. In an animated picture photographing apparatus, a device to support a picture sheet comprising a flat, compressible pad, and a rigid support for said pad; a glass plate adapted to be pressed down upon said pad to flatten a picture sheet against it; a picture element clip; and means supporting said clip on the under side of the said glass plate near one edge thereof, whereby a picture element may be secured by said clip to extend between the plate and the pad and appear through the plate and may be shifted away from the pad with the plate when the latter is raised.

15. In an animated picture photographing apparatus, a device to support a picture sheet comprising a flat, compressible pad, and a rigid support for said pad; a presser device for pressing a picture sheet flat against said pad comprising a rigid frame hinged at one side of said picture supporting device, and a glass presser plate mounted in said frame; a clip carried by the frame to detachably and adjustably hold a picture element to the presser device extending across the under face of the plate, whereby said element may be pressed against the pad or an interposed picture sheet thereon, will appear through the plate for photographing and will swing with the plate away from the pad; and a handle carried by the presser frame adjacent said clip for applying pressure to the plate and forcing the picture element toward the pad.

16. In an animated picture photographing apparatus, a device to support a picture sheet comprising a flat compressible rubber pad, and a rigid support for said pad; a presser device for pressing a picture sheet flat against said pad comprising a rigid frame hinged at one side of said picture-supporting device, and a glass presser plate mounted in said frame; and a clip carried by the frame to detachably hold a picture element to the presser device extending across the under face of the plate, whereby said element may be pressed against the pad or an interposed picture sheet thereon, will appear through the plate for photographing and will swing with the plate away from the pad.

17. In a picture photographing apparatus, a flat yieldable and resilient support for a picture sheet; upstanding sheet-retaining projections supported in laterally fixed positions and extending above the sheet-receiving surface of said support to engage in openings in a margin of the picture sheet and hold the sheet against edgewise displacement; and a rigid transparent presser plate shiftably mounted for pressing and flattening the picture sheet against said support, said plate being formed with openings to provide clearance for said projections and enable the plate to bear against said margin close to the projections and depress the margin evenly with the body of the sheet to prevent tearing of the sheet on said projections.

In testimony whereof I hereunto affix my signature.

ARTHUR WILTSEE CARPENTER.